(12) United States Patent
Kobayashi et al.

(10) Patent No.: US 7,402,123 B2
(45) Date of Patent: Jul. 22, 2008

(54) AUTOMATIC TRANSMISSION CONTROL METHOD AND SYSTEM HAVING FAIL-SAFE FUNCTION

(75) Inventors: Hiroyuki Kobayashi, Kanagawa (JP); Hajime Tasaka, Shizuoka (JP); Hirofumi Michioka, Kanagawa (JP)

(73) Assignee: Jatco Ltd, Shizuoka (JP)

( * ) Notice: Subject to any disclaimer, the term of this patent is extended or adjusted under 35 U.S.C. 154(b) by 231 days.

(21) Appl. No.: 11/443,164

(22) Filed: May 31, 2006

(65) Prior Publication Data

US 2006/0270515 A1    Nov. 30, 2006

(30) Foreign Application Priority Data

May 31, 2005    (JP)    ............... 2005-158502

(51) Int. Cl.
*F16H 61/02*    (2006.01)
(52) U.S. Cl. .............. 477/75; 477/69; 477/70; 477/79; 477/80; 477/125; 477/156; 477/162; 477/906; 701/62; 701/63; 701/76
(58) Field of Classification Search ............ None
See application file for complete search history.

(56) References Cited

U.S. PATENT DOCUMENTS

| | | | | |
|---|---|---|---|---|
| 5,790,969 A | * | 8/1998 | McKee ............ | 701/51 |
| 6,357,289 B1 | * | 3/2002 | Futawatari ............ | 73/118.1 |
| 6,634,991 B2 | * | 10/2003 | Itou et al. ............ | 477/156 |
| 7,255,019 B2 | * | 8/2007 | Wheeler et al. ............ | 74/336 R |
| 2006/0030446 A1 | * | 2/2006 | Nozaki et al. ............ | 475/119 |

FOREIGN PATENT DOCUMENTS

JP    2003-269602 A    9/2003

* cited by examiner

*Primary Examiner*—David D. Le
(74) *Attorney, Agent, or Firm*—Foley & Lardner LLP (57) ABSTRACT

In an automatic transmission control system and method, an electronic control unit is programmed to output a command to establish another gear stage different from the gear stage at the time of occurrence of fault-induced disengagement by combination of engagements of the friction elements other than the friction elements to be engaged at the time of occurrence of fault-induced disengagement, and simultaneously output a plurality of commands to establish a plurality of gear stages corresponding to combination of engagements of the friction elements to be engaged and disengaged, respectively, at the gear stage at the time of occurrence of fault-induced disengagement, when the gear stage at the time of occurrence of the fault-induced disengagement is a predetermined gear stage and the friction element undergoing the fault-induced disengagement is not determined.

15 Claims, 7 Drawing Sheets

|  | LOW/C | 3-5R/C | H/C | L&R/B | 2-6/B | LOW/OWC |
|---|---|---|---|---|---|---|
| 1st | ○ |  |  | ⊗ |  | ● |
| 2nd | ○ |  |  |  | ○ |  |
| 3rd | ○ | ○ |  |  |  |  |
| 4th | ○ |  | ○ |  |  |  |
| 5th |  | ○ | ○ |  |  |  |
| 6th |  |  | ○ |  | ○ |  |
| Rev |  | ○ |  | ○ |  |  |

⊗: ENGINE BRAKE

| SPEED WHEN OCCURRENCE OF FAULT-INDUCED DISENGAGEMENT IS DETERMINED | POSSIBLE FAULT-INDUCED DISENGAGEMENT PATTERN | | | | | GEAR STAGE CONDITION ALLOWABLE UPON OCCURRENCE OF FAULT-INDUCED DISENGAGEMENT |
|---|---|---|---|---|---|---|
| | LOW/C | 3-5R/C | H/C | L&R/B | 2-6/B | |
| 1st | ▲ | × | × | × | × | N |
| | ○ | × | × | × | ▲ | 1 |
| 2nd | ▲ | × | × | × | ○ | N |
| | ○ | ▲ | × | × | × | 1 |
| 3rd | ▲ | ○ | × | × | × | N |
| 4th | ○ | × | ▲ | × | × | 1 |
| | ▲ | × | ○ | × | × | N |
| 5th | × | ▲ | ○ | × | × | N |
| | × | ○ | ▲ | × | × | N |
| 6th | × | × | ○ | × | ▲ | N |
| | × | × | ▲ | × | ○ | N |

▲ : FAULT-INDUCED DISENGAGEMENT
○ : NORMAL ENGAGEMENT
× : NORMAL DISENGAGEMENT

| SPEED WHEN OCCURRENCE OF FAULT-INDUCED DISENGAGEMENT IS DETERMINED | PATTERN OF ENGAGEMENT COMMAND AFTER VEHICLE STOP | | | | | | AVOIDANCE GEAR STAGE SELECTABLE UPON OCCURRENCE OF FAULT-INDUCED DISENGAGEMENT |
|---|---|---|---|---|---|---|---|
| | LOW/C | 3-5R/C | H/C | L&R/C | 2-6/B | | |
| 1st | × | ○ | ○ | × | × | USE FRICTION ELEMENTS FREE FROM FAULT-INDUCED DISENGAGEMENT | 5 |
| 2nd | × | ○ | ○ | × | × | USE FRICTION ELEMENTS FREE FROM FAULT-INDUCED DISENGAGEMENT | 5 |
| 3rd | × | × | ○ | × | ○ | USE FRICTION ELEMENTS FREE FROM FAULT-INDUCED DISENGAGEMENT | 6 |
| 4th | ○ | ○ | ○ | × | × | USE FRICTION ELEMENTS INTERLOCKABLE IN NORMAL CONDITION | 3 OR 5 |
| 5th | ○ | × | × | × | ○ | USE FRICTION ELEMENTS FREE FROM FAULT-INDUCED DISENGAGEMENT | 2 |
| 6th | ○ | ○ | × | × | × | USE FRICTION ELEMENTS FREE FROM FAULT-INDUCED DISENGAGEMENT | 3 |

○: ENGAGEMENT COMMAND   ×: DISENGAGEMENT COMMAND

AUTOMATIC TRANSMISSION CONTROL METHOD AND SYSTEM HAVING FAIL-SAFE FUNCTION

BACKGROUND OF THE INVENTION

The present invention relates to automatic transmission control method and system having a fail-safe function. Specifically, the present invention relates to automatic transmission control method and system capable of performing fail-safe operation upon occurrence of failure in a hydraulic control device for friction elements of an automatic transmission such as a hydraulic control valve.

Conventional automatic transmission control systems are adapted to detect occurrence of electric failure in solenoids, sensors and the like in a hydraulic control circuit and perform fail-safe control depending on the electric failure detected. However, failure of automatic transmissions includes not only the electric failure but also mechanical failure of a hydraulic control valve for controlling a hydraulic pressure that is supplied to friction elements. For instance, the mechanical failure would be caused due to sticking of a valve body of the hydraulic control valve or lodging of a foreign object into the hydraulic control valve.

If the friction element to be engaged is caused to be in a disengagement state due to the mechanical failure of the hydraulic control valve, a gear stage different from instructed one will be established or a neutral stage will be established contrary to the instruction, namely, so-called neutral-fail will be caused, to thereby make it impossible to restart a vehicle after the stop. Occurrence of the operating failure of the hydraulic control valve can be readily detected. However, in contrast to the case of the electric failure, it is difficult to determine the friction element to which the operating failure relates.

Japanese Patent Application First Publication No. 2003-269602 discloses an automatic transmission control system in which when failure such as the neutral-fail is detected, a vehicle is temporarily stopped, and then an engagement command will be generated for engaging friction elements so as to establish a third speed in a low-speed range for the sake of vehicle emergency traveling in the low-speed range. In the automatic transmission control system of this conventional art, if the neutral condition is continued even after the engagement command is generated, then another engagement command will be output for engaging friction elements so as to establish a fifth speed in a high-speed range for the sake of vehicle emergency traveling in the high-speed range. In the conventional art, it is intended to enable the vehicle to restart by temporarily selecting any one of the gear stages even though it is not possible to determine the friction element to which the failure relates.

SUMMARY OF THE INVENTION

In the above-described conventional art, if the failure has occurred relating to the friction elements to be engaged in the high-speed range while the friction elements to be engaged in the low-speed range have been normal, the gear stage of the third speed can be quickly established to thereby restart the vehicle by generating the engagement command after the vehicle is stopped. However, if the failure also has occurred in the friction elements to be engaged in the low-speed range, the third speed commanded cannot be achieved and rapid increase in engine speed will be caused before the subsequent gear stage of the fifth speed is established. This makes a vehicle's occupant feel abnormal.

It is an object of the present invention to provide an automatic transmission control system and method which is capable of suppressing rapid increase in engine speed and preventing a vehicle's occupant from feeling abnormal.

In one aspect of the present invention, there is provided an automatic transmission control system, comprising:
a transmission gear train which perform multiple gear stages by combination of engagements of a plurality of friction elements; and
an electronic control unit is programmed to:
detect occurrence of fault-induced disengagement in any of the friction elements to be engaged at a current gear stage;
determine the friction element which is undergoing the fault-induced disengagement;
output a command to establish another gear stage different from the gear stage at the time of occurrence of the fault-induced disengagement by combination of engagements of the friction elements other than the friction elements to be engaged at the time of occurrence of the fault-induced disengagement; and
simultaneously output a plurality of commands to establish a plurality of gear stages corresponding to combination of engagement of the friction elements to be engaged at the gear stage at the time of occurrence of the fault-induced disengagement, and engagement of the friction elements to be disengaged at the gear stage at the time of occurrence of the fault-induced disengagement to thereby establish any one of the plurality of gear stages by combination of engagement of the friction element free from the fault-induced disengagement among the friction elements to be engaged at the gear stage at the time of occurrence of the fault-induced disengagement, and engagement of the friction elements to be disengaged at the gear stage at the time of occurrence of the fault-induced disengagement, when the gear stage at the time of occurrence of the fault-induced disengagement is a predetermined gear stage which is established by combination of engagements of the friction elements which independently constitute an essential friction element to be engaged for establishing any of gear stages other than the predetermined gear stage, and the friction element undergoing the fault-induced disengagement is not determined.

In a further aspect of the present invention, there is provided an automatic transmission control system, comprising:
a transmission gear train which perform multiple gear stages by combination of engagements of a plurality of friction elements;
a detection means for detecting occurrence of fault-induced disengagement in any of the friction elements to be engaged at a current gear stage;
a determination means for determining the friction element which is undergoing the fault-induced disengagement; and
a command means for outputting a command to establish another gear stage different from the gear stage at the time of occurrence of the fault-induced disengagement by combination of engagements of the friction elements other than the friction elements to be engaged at the time of occurrence of the fault-induced disengagement,
wherein the command means further simultaneously outputs a plurality of commands to establish a plurality of gear stages corresponding to combination of engagement of the friction elements to be engaged at the gear stage at the time of occurrence of the fault-induced disengagement, and engagement of the friction elements to be disengaged at the gear stage at the time of occurrence of the fault-induced disengagement to thereby establish any one of the plurality of gear stages by combination of engagement of the friction element free from the fault-induced disengagement among the friction elements to be engaged at the gear stage at the time of occurrence of the fault-induced disengagement, and engagement of the friction elements to be disengaged at the gear stage at the time of occurrence of the fault-induced disengagement, when the gear stage at the time of occurrence of the fault-induced disengagement is a predetermined gear stage which is established by combination of engagements of the friction elements which independently constitute an essential friction element to be engaged for establishing any of gear stages other than the predetermined gear stage, and the friction element undergoing the fault-induced disengagement is not determined by the determination means.

In a still further aspect of the present invention, there is provided a method of controlling an automatic transmission, the automatic transmission including a transmission gear train which perform multiple gear stages by combination of engagements of a plurality of friction elements, the method comprising:

detecting occurrence of fault-induced disengagement in any of the friction elements to be engaged at a current gear stage;

determining the friction element which is undergoing the fault-induced disengagement;

determining whether the gear stage at the time of occurrence of the fault-induced disengagement is a predetermined gear stage which is established by combination of engagements of the friction elements which independently constitute an essential friction element to be engaged for establishing any of gear stages other than the predetermined gear stage;

conducting a first control in abnormal condition by outputting a command to establish another gear stage different from the gear stage at the time of occurrence of the fault-induced disengagement by combination of engagements of the friction elements other than the friction element which is undergoing the fault-induced disengagement when the friction element undergoing the fault-induced disengagement is determined;

conducting a second control in abnormal condition by simultaneously outputting a plurality of commands to establish a plurality of gear stages corresponding to combination of engagement of the friction elements to be engaged at the gear stage at the time of occurrence of the fault-induced disengagement, and engagement of the friction elements to be disengaged at the gear stage at the time of occurrence of the fault-induced disengagement to thereby establish any one of the plurality of gear stages by combination of engagement of the friction element free from the fault-induced disengagement among the friction elements to be engaged at the gear stage at the time of occurrence of the fault-induced disengagement, and engagement of the friction elements to be disengaged at the gear stage at the time of occurrence of the fault-induced disengagement, when the gear stage at the time of occurrence of the fault-induced disengagement is the predetermined gear stage and the friction element undergoing the fault-induced disengagement is not determined; and conducting a third control in abnormal condition by outputting a command to establish another gear stage different from the gear stage at the time of occurrence of the fault-induced disengagement by combination of engagements of the friction elements other than the friction elements to be engaged at the time of occurrence of the fault-induced disengagement, when the gear stage at the time of occurrence of the fault-induced disengagement is any of gear stages other than the predetermined gear stage and the friction element undergoing the fault-induced disengagement is not determined.

DETAILED DESCRIPTION OF THE INVENTION

Figure 1:
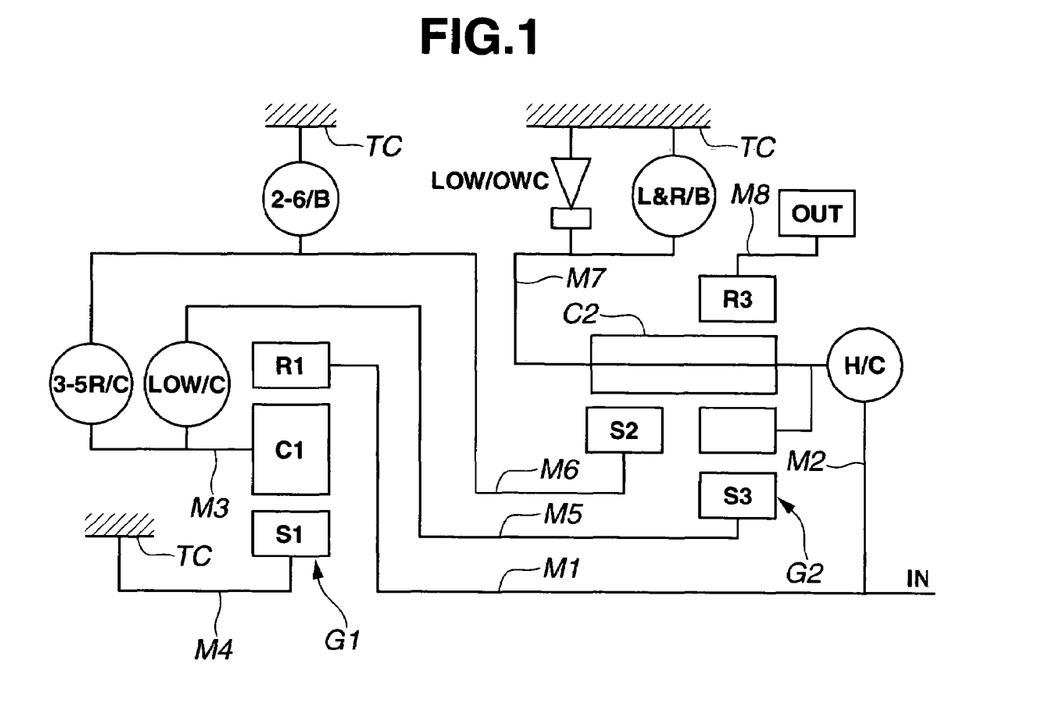
FIG. 1 is a skeleton diagram of a gear train of an automatic transmission to which a system and method of an embodiment of the present invention is applicable.

Referring to FIGS. 1-9, an embodiment of a system and method for controlling an automatic transmission, according to the present invention is explained. FIG. 1 shows a gear train of the automatic transmission to which the system and method of the embodiment is applicable. The gear train includes combination of simple planetary-gear set G1 and Ravigneoux-type composite planetary-gear set G2. Simple planetary-gear set G1 includes first sun gear S1, first carrier C1 and first ring gear R1. Ravigneoux-type composite planetary-gear set G2 includes second sun gear S2, second carrier C2, third sun gear S3 and third ring gear R3.

Input shaft IN to which engine torque is input via an engine and a torque converter, not shown, is coupled to first ring gear R1 directly through first member M1. Input shaft IN also is coupled to second carrier C2 through second member M2 and high clutch H/C. First carrier C1 is coupled to third sun gear S3 through third member M3, low clutch LOW/C and fifth member M5, and also to second sun gear S2 through third member M3, 3-5 reverse clutch 3-5R/C and sixth member M6. Sixth member M6 is arranged fixable and releasable with respect to transmission casing TC through 2-6 brake 2-6/B.

First sun gear S1 is fixed to transmission casing TC through fourth member M4. Second carrier C2 is supported to transmission casing TC to be rotatable in one direction through seventh member M7 and low and reverse brake L&R/B and low one-way clutch LOW/OWC which are disposed in parallel. A restraint and a restraint cancellation of rotation of second carrier C2 are possible. Third ring gear R3 is coupled to output gear OUT through eighth member M8.

Figure 2:
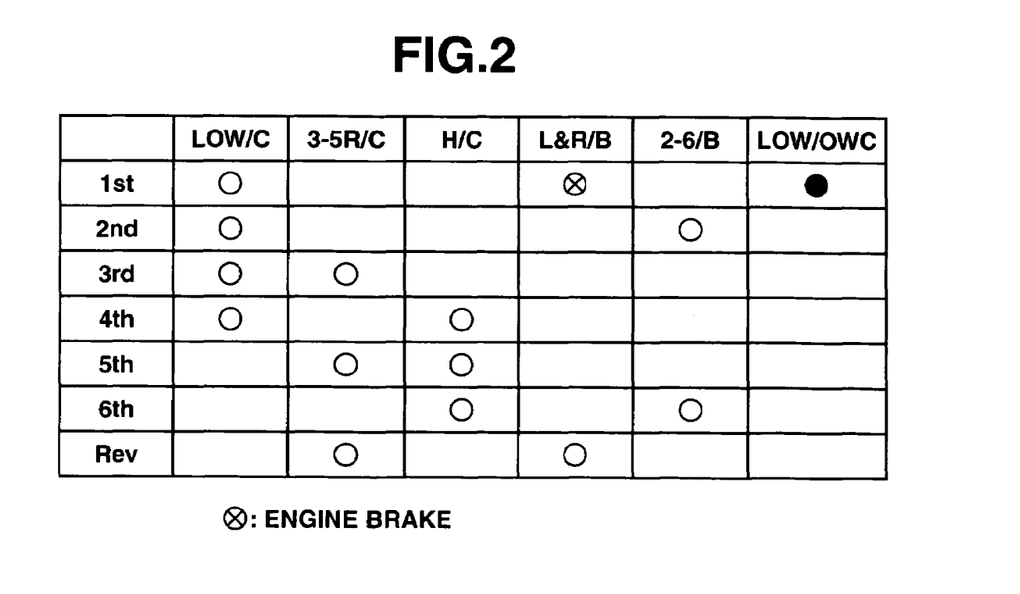
FIG. 2 is a diagram showing an engagement combination of friction elements of the automatic transmission shown in FIG. 1.

The thus-constructed automatic transmission has gear stages of six forward speeds 1ST-6TH and one reverse REV in combination of engagement and disengagement (release) of friction elements as shown in FIG. 2. In FIG. 2, a cell with circle denotes engagement, a cell with no sign denotes release, a cell with cross in circle denotes engagement carried out during engine braking, and a hatched cell denotes mechanical engagement or restrained rotation during engine driving. The automatic transmission performs automatic shift control of six forward speeds 1ST-6TH in the D-range position in accordance with a shift schedule set on the basis of vehicle speed and throttle opening, and shift control of one reverse REV through select operation from the D-range position to the R-range position. The six forward gear stages are divided into two groups one of which is in a low-speed range and the other is in a high-speed range. Here, low clutch LOW/C is commonly used at first speed 1ST through third speed 3RD in the low-speed range, and high clutch H/C is commonly used at fourth speed 4TH through sixth speed 6TH in the high-speed range.

Next, a rotation transmitting route in the respective gear stages is explained by referring to FIGS. 1 and 2. First speed 1ST is achieved through engagement of low clutch LOW/C with low and reverse brake L&R/B or low one-way clutch LOW/OWC. At first speed 1ST, rotation of input shaft IN reduced through first member M1 and simple planetary-gear set G1 is input to third sun gear S3 through third member M3, low clutch LOW/C and fifth member M5. Through engagement of low one-way clutch LOW/OWC, third ring gear R3 is reduced in rotation while receiving a reaction from second carrier C2 fixed to transmission casing TC, so that reduced rotation at the maximum reduction ratio is output from output gear OUT through eighth member M8. During engine braking, low and reverse brake L&R/B receives a reaction in place of low one-way clutch LOW/OWC which is in idle.

Second speed 2ND is achieved through engagement of low clutch LOW/C and 2-6 brake 2-6/B. At second speed 2ND, rotation of input shaft IN reduced through first member M1 and simple planetary-gear set G1 is input to third sun gear S3 through third member M3, low clutch LOW/C and fifth member M5. Through engagement of 2-6 brake 2-6/B, third ring gear R3 is reduced in rotation while receiving a reaction from second sun gear S2 fixed to transmission casing TC, so that reduced rotation at a reduction ratio smaller than that of first speed 1ST is output from output gear OUT through eighth member M8.

Third speed 3RD is achieved through engagement of low clutch LOW/C and 3-5 reverse clutch 3-5R/C. At third speed 3RD, rotation of input shaft IN reduced through first member M1 and simple planetary-gear set G1 is input to third sun gear S3 through third member M3, low clutch LOW/C and fifth member M5, and also to second sun gear S2 through third member M3, 3-5 reverse clutch 3-5R/C and sixth member M6. This achieves direct coupling of Ravigneoux-type composite planetary-gear set G2, whereby third ring gear R3 is rotated in the same direction as that of sun gears S2 and S3, and reduced rotation at a reduction ratio smaller than that of second speed 2ND is output from output gear OUT through eighth member M8.

Fourth speed 4TH is achieved through engagement of low clutch LOW/C and high clutch H/C. At fourth speed 4TH, on the one hand, rotation of input shaft IN reduced through first member M1 and simple planetary-gear set G1 is input to third sun gear S3 through third member M3, low clutch LOW/C, and fifth member M5. On the other hand, rotation of input shaft IN without being reduced is input to second carrier C2 through second member M2 and high clutch H/C. Third ring gear R3 is rotated at the middle rotation rate between the two input-rotation rates, so that rotation slightly reduced with respect to the input rotation is output from output gear OUT through eighth member M8.

Fifth speed 5TH is achieved through engagement of 3-5 reverse clutch 3-5R/C and high clutch H/C. At fifth speed 5TH, on the one hand, rotation of input shaft IN reduced through first member M1 and simple planetary-gear set G1 is input to second sun gear S2 through third member M3, 3-5 reverse clutch 3-5R/C and sixth member M6. On the other hand, rotation of input shaft IN without being reduced is input to second carrier C2 through second member M2 and high clutch H/C. Third ring gear R3 is rotated with being restricted by the two input-rotations, so that rotation slightly increased with respect to the input rotation is output from output gear OUT through eighth member M8.

Sixth speed 6TH is achieved through engagement of high clutch H/C and 2-6 brake 2-6/B. At sixth speed 6TH, rotation of input shaft IN without being reduced is input to only second carrier C2 through second member M2 and high clutch H/C. Third ring gear R3 is increased in rotation while receiving a reaction from second sun gear S2 fixed to transmission casing TC through engagement of 2-6 brake 2-6/B, so that rotation further increased with respect to fifth speed 5TH is output from output gear OUT through eighth member M8.

Reverse REV is achieved through engagement of 3-5 reverse clutch 3-5R/C and low and reverse brake L&R/B. At reverse REV, rotation of input shaft IN reduced through first member M1 and simple planetary-gear set G1 is input to second sun gear S2 through third member M3, 3-5 reverse clutch 3-5R/C and sixth member M6. Third ring gear R3 is rotated in the reverse direction while receiving a reaction from second carrier C2 fixed to transmission casing TC through engagement of low and reverse brake L&R/B, so that reduced reverse rotation is output from output gear OUT through eighth member M8.

Figure 3:
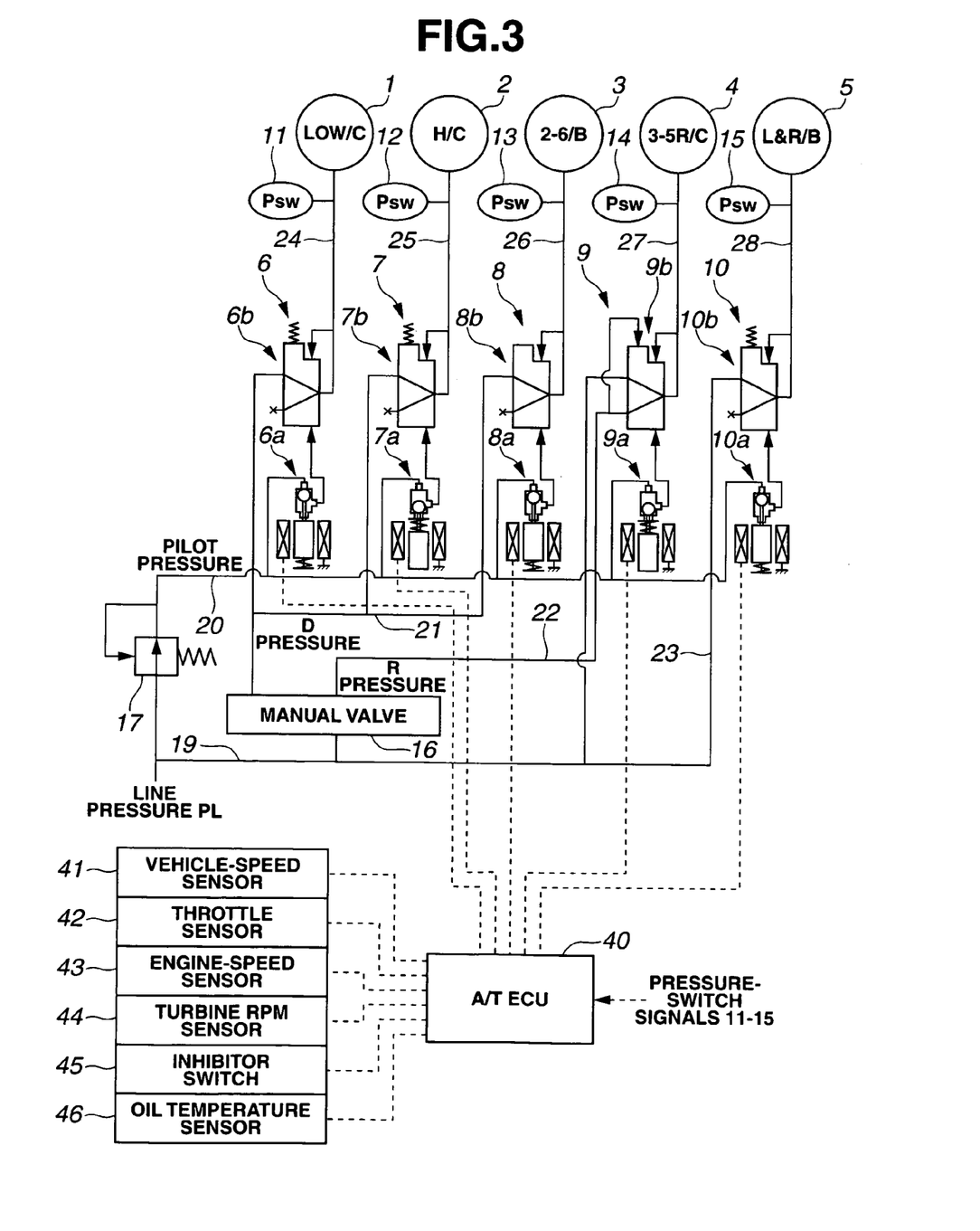
FIG. 3 is a diagram showing a hydraulic circuit and an electronic shift-control system in the embodiment.

Referring to FIG. 3, a hydraulic circuit and an electronic shift-control system for achieving the shift control are explained. Low clutch LOW/C, high clutch H/C, 2-6 brake 2-6/B, 3-5 reverse clutch 3-5R/C, and low and reverse brake L&R/B are engaged by supplying the engaging pressure, i.e. D-range pressure or R-range pressure, to engaging piston chambers 1-5, and are released by relieving the engaging pressure therefrom. The D-range pressure is a line pressure obtained through a manual valve as explained later, and is produced only when selecting the D range. The R-range pressure is a line pressure obtained through the manual valve, and is produced only when selecting the R range. In the other ranges than the R range, no pressure is produced by changeover to a drain port, not shown.

As illustrated in FIG. 3, the hydraulic circuit includes first hydraulic control valve 6, second hydraulic control valve 7, third hydraulic control valve 8, fourth hydraulic control valve 9 and fifth hydraulic control valve 10. First hydraulic control valve 6 controls the engaging pressure (low-clutch pressure) to engaging piston chamber 1 of low clutch LOW/C. Second hydraulic control valve 7 controls the engaging pressure (high-clutch pressure) to engaging piston chamber 2 of high clutch H/C. Third hydraulic control valve 8 controls the engaging pressure (2-6 brake pressure) to engaging piston chamber 3 of 2-6 brake 2-6/B. Fourth hydraulic control valve 9 controls the engaging pressure (3-5 reverse-clutch pressure) to engaging piston chamber 4 of 3-5 reverse clutch 3-5R/C. Fifth hydraulic control valve 10 controls the engaging pressure (low and reverse brake pressure) to engaging piston chamber 5 of low and reverse brake L&R/B.

First to third hydraulic control valves 6-8 receive the D-range pressure from manual valve 16 through D-range pressure passage 21. Manual valve 16 is supplied with line pressure PL via line pressure passage 19. Fourth hydraulic control valve 9 is directly supplied with line pressure PL and receives the R-range pressure from manual valve 16 through R-range pressure passage 22. Fifth hydraulic control valve 10 is directly supplied with line pressure PL. First to fifth hydraulic control valves 6-10 receive a pilot pressure that is obtained by regulating line pressure PL by pilot valve 17, through pilot pressure passage 20.

First hydraulic control valve 6 includes first duty solenoid 6a and first pressure regulating valve 6b. First duty solenoid 6a produces the shift-control pressure by a solenoid force using the pilot pressure as source pressure. First pressure regulating valve 6b regulates the low-clutch pressure using the D-range pressure as source pressure and the shift-control pressure and feedback pressure as operating signal pressure. First duty solenoid 6a is controlled in accordance with the duty ratio in such a manner as to bring the low-clutch pressure to zero when placed in OFF position, and increase the low-clutch pressure with an increase in the ON duty ratio when placed in ON position.

Second hydraulic control valve 7 includes second duty solenoid 7a and second pressure regulating valve 7b. Second duty solenoid 7a produces the shift-control pressure by a solenoid force using the pilot pressure as source pressure. Second pressure regulating valve 7b regulates the high-clutch pressure using the D-range pressure as source pressure and the shift-control pressure and feedback pressure as operating signal pressure. Second duty solenoid 7a is controlled in such a manner as to bring the high-clutch pressure to zero when placed in ON position (100% ON duty ratio), increase the high-clutch pressure with a decrease in the ON duty ratio, and bring the high-clutch pressure to the maximum pressure when placed in OFF position.

Third hydraulic control valve 8 includes third duty solenoid 8a and third pressure regulating valve 8b. Third duty solenoid 8a produces the shift-control pressure by a solenoid force using the pilot pressure as source pressure. Third pressure regulating valve 8b regulates the 2-6 brake pressure using the D-range pressure as source pressure and the shift-control pressure and feedback pressure as operating signal pressure. Third duty solenoid 8a is controlled in such a manner as to bring the 2-6 brake pressure to zero when placed in OFF position, and increase the 2-6 brake pressure with an increase in the ON duty ratio when placed in ON position.

Fourth hydraulic control valve 9 includes fourth duty solenoid 9a and fourth pressure regulating valve 9b. Fourth duty solenoid 9a produces the shift-control pressure by a solenoid force using the pilot pressure as source pressure. Fourth pressure regulating valve 9b regulates the 3-5 reverse-clutch pressure using the line pressure as source pressure and the shift-control pressure and feedback pressure as operating signal pressure when the D range is selected, and directly supplies the line pressure, i.e., R-range pressure, as 3-5 reverse-clutch pressure using the R-range pressure as operating signal pressure when the R-range is selected. Fourth duty solenoid 9a is controlled in such a manner as to bring the 3-5 reverse-clutch pressure to zero when placed in ON position (100% ON duty ratio), increase the 3-5 reverse-clutch pressure with a decrease in the ON duty ratio, and bring the 3-5 reverse-clutch pressure to the maximum pressure when placed in OFF position.

Fifth hydraulic control valve 10 includes fifth duty solenoid 10a and fifth pressure regulating valve 10b. Fifth duty solenoid 10a produces the shift-control pressure by a solenoid force using the pilot pressure as source pressure. Fifth pressure regulating valve 10b regulates the low and reverse brake pressure using the line pressure as source pressure and the shift-control pressure and feedback pressure as operating signal pressure. Fifth duty solenoid 10a is controlled in such a manner as to bring the low and reverse brake pressure to zero when placed in OFF position, and increase the low and reverse brake pressure with an increase in the ON duty ratio when placed in ON position.

As illustrated in FIG. 3, first pressure switch 11 is disposed in low-clutch pressure passage 24 through which first hydraulic control valve 6 and engaging piston chamber 1 are connected with each other. Second pressure switch 12 is disposed in high-clutch pressure passage 25 through which second hydraulic control valve 7 and engaging piston chamber 2 are connected with each other. Third pressure switch 13 is disposed in 2-6 brake pressure passage through which third hydraulic control valve 8 and engaging piston chamber 3 are connected with each other. Fourth pressure switch 14 is disposed in 3-5 reverse-clutch pressure passage 27 through which fourth hydraulic control valve 9 and engaging piston chamber 4 are connected with each other. Fifth pressure switch 15 is disposed in low and reverse brake pressure passage 28 through which fifth hydraulic control valve 10 and engaging piston chamber 5 are connected with each other. First to fifth pressure switches 11-15 respectively generate ON signal when the engaging pressure is present in passages 24 to 28, and OFF signal when the engaging pressure is not present in passages 24 to 28.

The electronic shift-control system includes automatic transmission (A/T) electronic control unit (ECU) 40 which receives signals generated from vehicle-speed sensor 41, throttle sensor 42, engine-speed sensor 43, turbine rpm sensor 44, inhibitor switch 45, and oil-temperature sensor 46 and ON and OFF signals generated from pressure switches 11-15. A/T ECU 40 carries out computing on the basis of the signals from sensors 41-46 and switches 11-15 and a preprogrammed shift-control regulation and fail-safe control regulation. In accordance with the results of computing, A/T ECU 40 outputs solenoid drive signals to first to fifth duty solenoids 6a-10a.

A/T ECU 40 further carries out judgment of occurrence of failure in friction elements in parallel with the above computing. When it is determined that failure has occurred in the friction element to be engaged so that the friction element is brought into a disengagement state due to failure or malfunction of parts such as valves of the hydraulic circuit, A/T ECU 40 determines whether or not the friction element in the disengagement state by failure can be identified. If the friction element in the disengagement state by failure cannot been identified, A/T ECU 40 determines whether or not any other gear stage can be established using friction elements that are not in the disengagement state by failure, and outputs a command to establish an appropriate gear stage depending on the determination results. Here, from the viewpoint of malfunction in which a gear ratio as expected at the gear stage commanded cannot be obtained, the disengagement state by failure of the friction element includes not only a full-disengagement state of the friction element in which power transmission is completely disabled, but also an insufficient-disengagement state of the friction element in which complete engagement of the friction element is not achieved in spite of an engagement command output. The disengagement state by failure will be hereinafter referred to as fault-induced disengagement.

Figure 4:
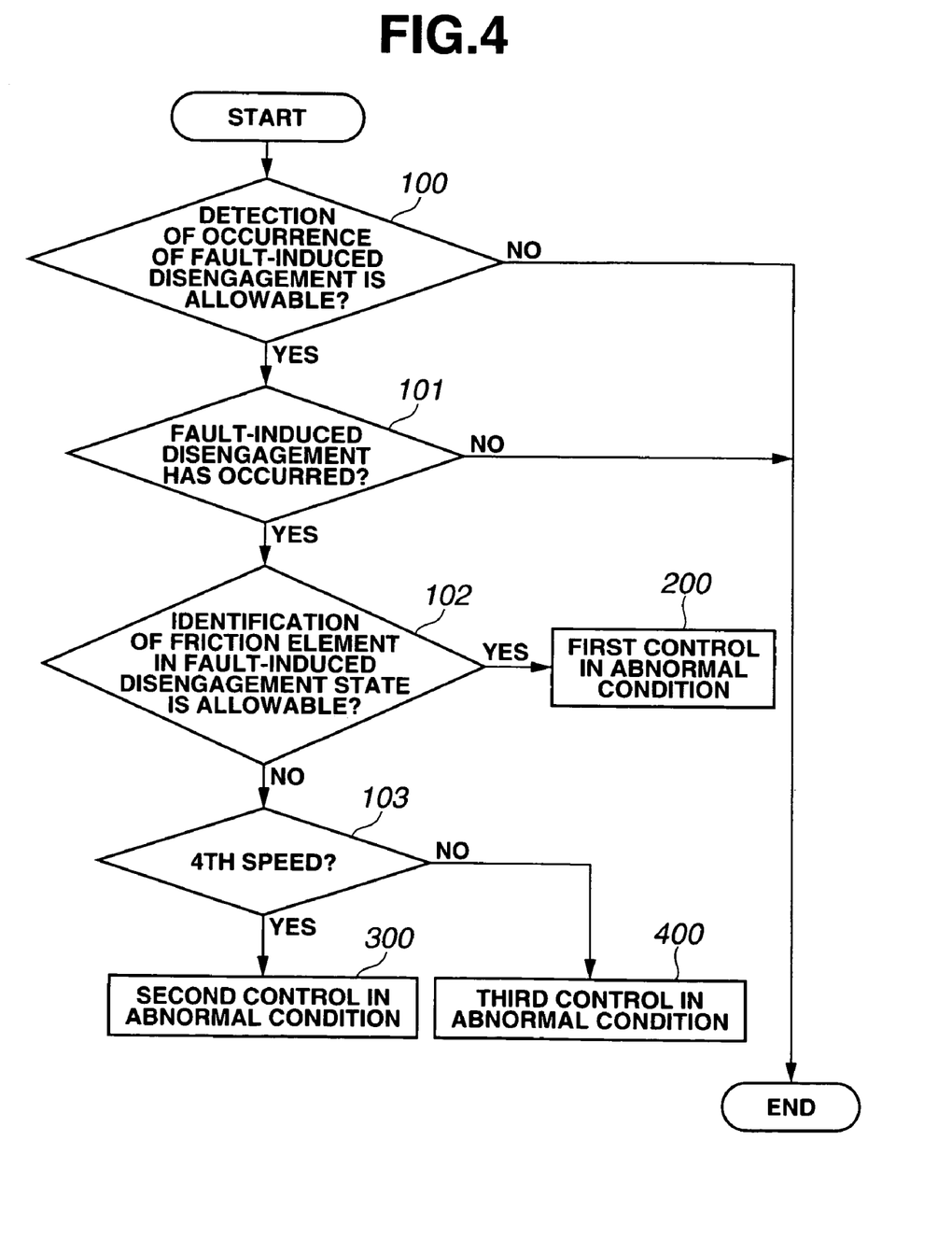
FIG. 4 is a main flowchart showing a control that is carried out upon occurrence of disengagement caused by failure in friction elements of the automatic transmission of the embodiment.

Referring to FIGS. 4 and 6-9, the control which is executed by A/T ECU 40 upon occurrence of the fault-induced disengagement in the friction elements is explained. FIG. 4 illustrates a main flowchart of the control. Logic flow starts and goes to block 100 where a determination as to whether detection of the fault-induced disengagement of friction elements is allowable is made. Specifically, if the electronic shift-control system, namely, the sensors, the switches and the solenoids as described above, is in a normal state, the shift control is not carried out, and a select lever is placed in a position other than parking P, neutral N and reverse R, it is determined that the detection of fault-induced disengagement of friction elements can be made. When the answer to block 100 is no, the logic flow goes to end.

Figure 5:
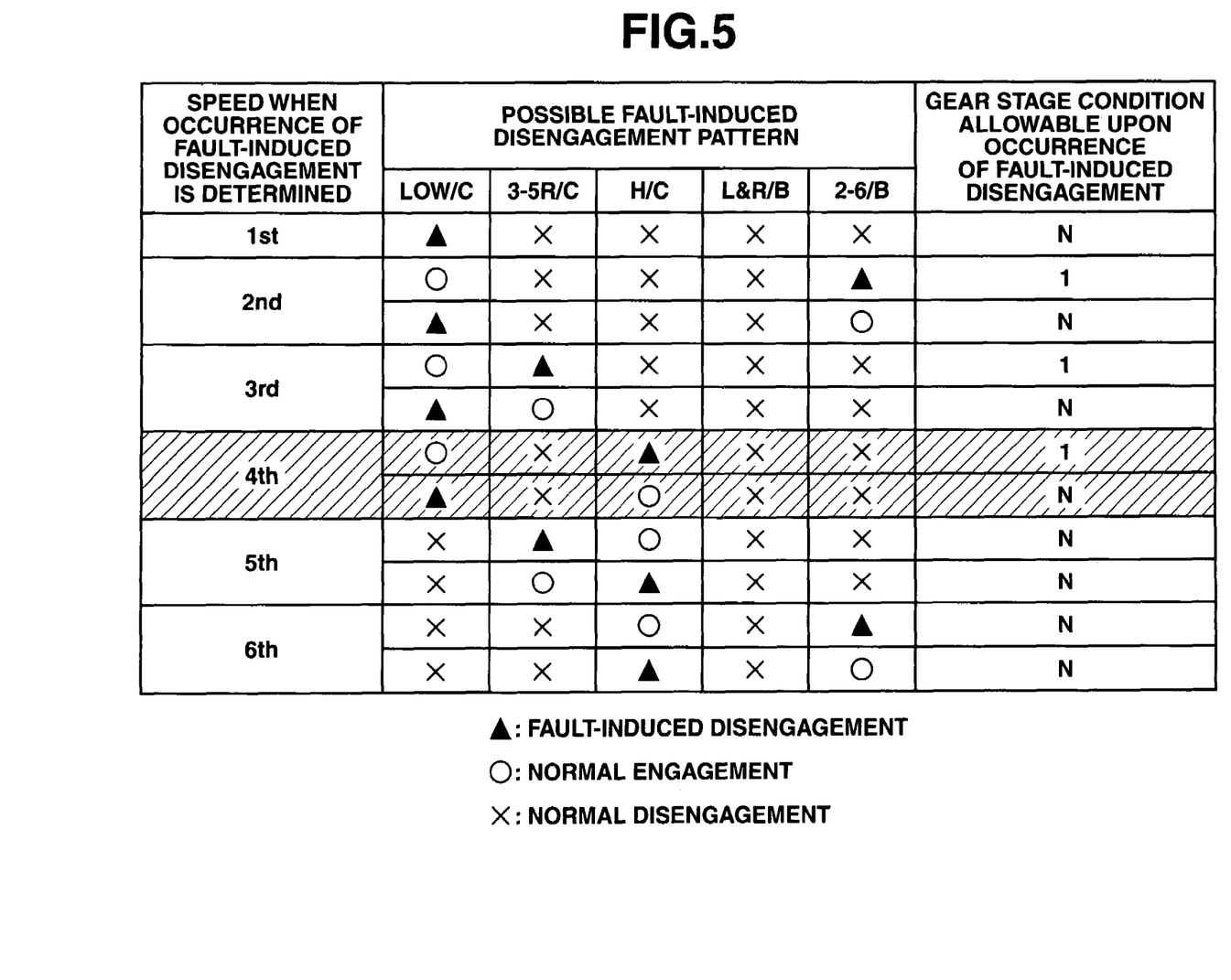
FIG. 5 is a diagram showing a pattern of the disengagement of friction elements which is caused by failure.

When the answer to block 100 is yes, the logic flow proceeds to block 101 where a determination as to whether the fault-induced disengagement has occurred in friction elements to be engaged at a current gear stage is made. FIG. 5 illustrates a pattern of the fault-induced disengagement of friction elements which is possible at the forward gear stages on the basis of the engagement and disengagement diagram as shown in FIG. 2. In FIG. 5, a cell with circle denotes normal engagement, a cell with hatched triangle denotes the fault-induced disengagement, and a cell with cross denotes normal disengagement. Further, in FIG. 5, the gear stage condition allowable upon occurrence of the fault-induced disengagement denotes the gear stage which can be achieved by combination of only the friction elements which are in a normal engagement state. As shown in FIG. 5, the gear stage which is allowable upon occurrence of the fault-induced disengagement is either neutral N or first speed 1ST. The power transmission is not performed at the neutral N, and first speed 1ST is useable for starting but not practicable for traveling on an ordinary road together with other vehicles.

As illustrated in FIG. 5, the gear stage allowable upon occurrence of the fault-induced disengagement at fourth speed 4TH is neutral N or first speed 1ST. At this time, it is likely to consider that when the gear ratio corresponds to first speed 1ST, it is possible to determine that the fault-induced disengagement has occurred in high clutch H/C. Alternatively, it is likely to consider that when the gear ratio corresponds to neutral N, it is possible to determine that the fault-induced disengagement has occurred in low clutch LOW/C. However, since first speed 1ST is the gear stage achieved by engagement of low one-way clutch LOW/OWC as shown in FIG. 2, the actual gear ratio is not more than the gear ratio at first speed 1ST and becomes unstable. Therefore, even when the fault-induced disengagement of the friction element has occurred during traveling at fourth speed 4TH, it is not possible to determine whether the actual gear stage is first speed 1ST or neutral N unless the engine speed is increased until the gear ratio reaches the value corresponding to first speed 1ST. Further, in some cases, it is mechanically impossible to increase the engine speed until the gear ratio reaches the value corresponding to first speed 1ST. As a result, it is difficult to accurately determine the gear stage at the time of occurrence of the fault-induced disengagement of the friction element.

For the above-described reason, at block 101, when the actual gear ratio is largely offset relative to the gear ratio set at the current gear stage by a value not less than a preset value, it is determined that the fault-induced disengagement of the friction element has occurred. More specifically, at block 101, the signals output from vehicle-speed sensor 41, throttle sensor 42 and turbine rpm sensor 44 are read-in. If vehicle speed Ns, the throttle opening degree, turbine rotational speed Nt are not less than preset values, respectively, and the following relationship between vehicle speed Ns and turbine rotational speed Nt is continued for a predetermined period, it is determined that the fault-induced disengagement of the friction element has occurred.

$$Nt/Ns \geq I+\alpha$$

wherein, I represents a gear ratio set at the current gear stage, and α represents a constant value. Nt/Ns indicates an actual gear ratio. When the answer to block 101 is no, indicating that the fault-induced disengagement has not occurred, the logic flow goes to end.

When the answer to block 101 is yes, the logic flow goes to block 102 where a determination as to whether identification of the friction element in the fault-induced disengagement state is allowable is made. Specifically, if the fault-induced disengagement has occurred during the vehicle traveling at first speed 1ST, the friction element undergoing the fault-induced disengagement can be identified as low clutch LOW/C. This is because first speed 1ST is achieved by engagement of only low clutch LOW/C as seen from FIG. 2. As shown in FIG. 5, when occurrence of the fault-induced disengagement is determined, identification of the friction element in the fault-induced disengagement state can be made only when the gear stage is first speed 1ST. Thus, when the answer to block 102 is yes, the logic flow goes to block 200 where first control in abnormal condition as explained later is executed.

In contrast, if the fault-induced disengagement has occurred when the gear stage is fourth speed 4TH which is achieved by combination of engagement of high clutch H/C and engagement of low clutch LOW/C as shown in FIG. 2, the friction element in the fault-induced disengagement state may be high clutch H/C or low clutch LOW/C as shown in FIG. 5, except the case where both high clutch H/C and low clutch LOW/C are in the fault-induced disengagement state. Therefore, when the fault-induced disengagement has occurred at fourth speed 4TH, it is not possible to determine whether high clutch H/C is in the fault-induced disengagement state and low clutch LOW/C is in the normal engagement state, or whether high clutch H/C is in the normal engagement state and low clutch LOW/C is in the fault-induced disengagement state. Thus, when the answer to block 102 is no, the logic flow goes to block 103.

At block 103, a determination as to whether the gear stage at the time of occurrence of the fault-induced disengagement is a predetermined gear stage which is established by combination of engagements of the friction elements which independently constitute an essential friction element to be engaged for establishing any of gear stages other than the predetermined gear stage. In this embodiment, the predetermined gear stage is fourth speed 4TH. When the answer to block 103 is yes, indicating that the gear stage at the time of occurrence of the fault-induced disengagement is fourth speed 4TH, the logic flow goes to block 300 where second control in abnormal condition as explained later is executed. When the answer to block 103 is no, indicating that the gear stage at the time of occurrence of the fault-induced disengagement is not fourth speed 4TH, the logic flow goes to block 400 where third control in abnormal condition as explained later is executed.

Figure 6:
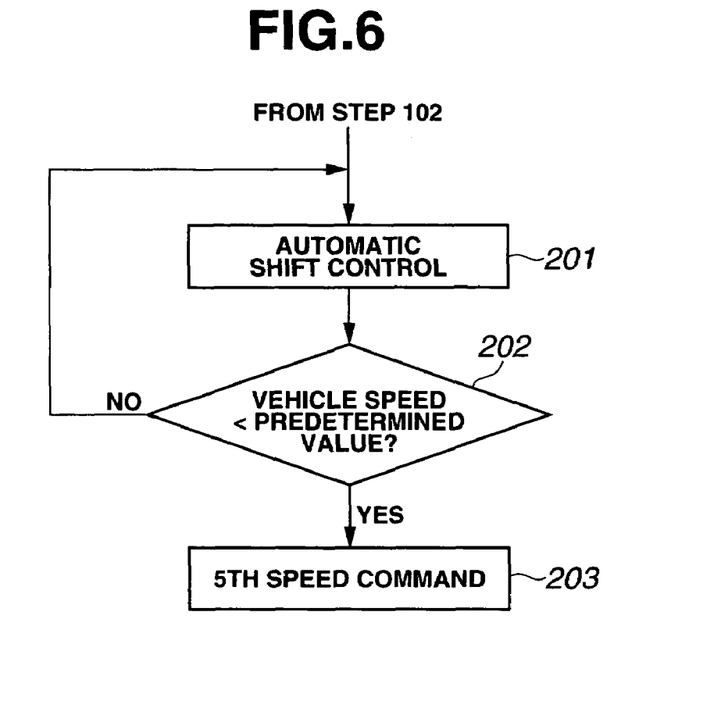
FIGS. 6-8 are flowcharts showing details of controls in abnormal condition, respectively.

Referring to FIG. 6, the first control in abnormal condition which is carried out at block 200 of FIG. 4 is explained. Logic flow goes to block 201 where an automatic shift control is conducted on the basis of the vehicle speed and the throttle opening degree. The logic flow then goes to block 202 where a determination as to whether the vehicle speed is smaller than a preset value is made. If the answer to block 202 is yes, it indicates that the vehicle is stopped. If the answer to block 202 is no, the logic flow goes back to block 201. That is, a normal operation of the automatic shift control is continuously conducted until the vehicle is stopped. Actually, even in the case of the neutral fail state, the vehicle can be stopped by a braking operation. When the answer to block 202 is yes, the logic flow goes to block 203.

At block 203, a command to achieve fifth speed 5TH is output. In other words, at block 203, a command to establish engagement of high clutch H/C and engagement of 3-5 reverse clutch 3-5R/C is output. Fifth speed 5TH among the gear stages which can be established without engagement of low clutch LOW/C in the fault-induced disengagement state has the largest gear ratio. Fifth speed 5TH serves as an avoidance gear stage that can be achieved without engagement of low clutch LOW/C in the fault-induced disengagement state. As a result, fifth speed 5TH can be immediately established, and restart of the vehicle can be carried out. This suppresses rapid increase in engine speed. Further, since fifth speed 5TH among the plural gear stages which can act as the avoidance gear stage has the largest gear ratio and provides a largest start torque, start of the vehicle can be readily conducted.

Figure 7:
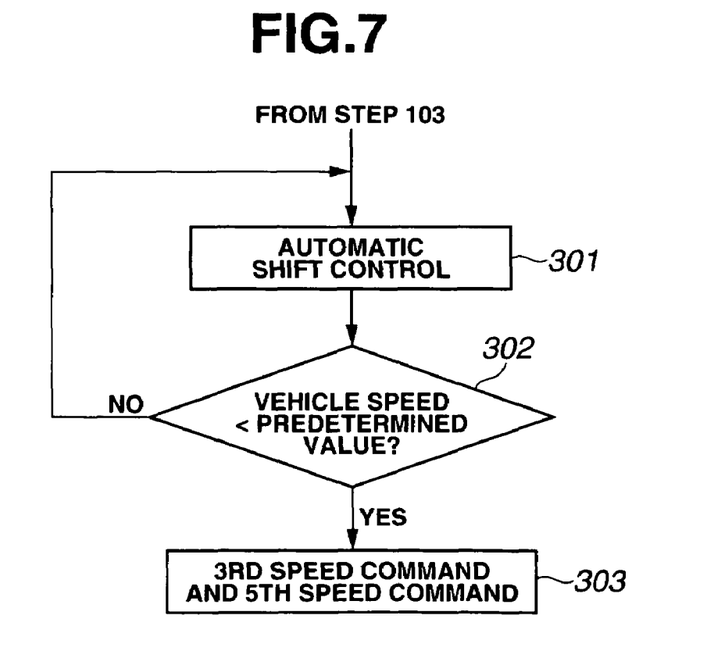

Referring to FIG. 7, the second control in abnormal condition which is carried out at block 300 of FIG. 4 is explained. In the second control in abnormal condition, operations at blocks 301 and 302 are the same as those at blocks 201 and 202 of the first control in abnormal condition as explained above, and therefore, detailed explanations therefor are omitted. When the answer to block 302 is no, the logic flow goes back to block 301. When the answer to block 302 is yes, indicating that the vehicle is stopped, the logic flow goes to block 303. At block 303, a command to achieve third speed 3RD and a command to achieve fifth speed 5TH are output simultaneously. In other words, at block 303, a command to establish combination of engagement of 3-5 reverse clutch 3-5R/C and engagement of low clutch LOW/C and a command to establish combination of engagement of 3-5 reverse clutch 3-5R/C and engagement of high clutch H/C are output simultaneously. This is because the engagement of 3-5 reverse clutch 3-5R/C can achieve third speed 3RD in combination with the engagement of low clutch LOW/C and achieve fifth speed 5TH in combination with the engagement of high clutch H/C.

If 3-5 reverse clutch 3-5R/C, low clutch LOW/C and high clutch H/C are normal, the engagement combination thereof will cause interlocking thereof. However, in the event that the fault-induced disengagement has occurred in either of low clutch LOW/C and high clutch H/C, either of third speed 3RD and fifth speed 5TH can be established by combination of the engagement of 3-5 reverse clutch 3-5R/C and the engagement of either of low clutch LOW/C and high clutch H/C which is normal. That is, if high clutch H/C is in the fault-induced disengagement state, third speed 3RD can be established by combination of the engagement of low clutch LOW/C and the engagement of 3-5 reverse clutch 3-5R/C immediately after the vehicle is stopped. Otherwise, if low clutch LOW/C is in the fault-induced disengagement state, fifth speed 5TH can be established by combination of the engagement of high clutch H/C and the engagement of 3-5 reverse clutch 3-5R/C immediately after the vehicle is stopped. Accordingly, the vehicle can be started without causing rapid increase in engine speed.

Specifically, as explained above, if the fault-induced disengagement has occurred when the gear stage is fourth speed 4TH, it is not possible to determine whether the friction element in the fault-induced disengagement state is low clutch LOW/C or high clutch H/C. However, as seen from FIG. 2, the gear stages except for fourth speed 4TH among first speed 1ST to sixth speed 6TH cannot be established without engagement of either of low clutch LOW/C and high clutch H/C. Namely, low clutch LOW/C must be in the engagement state when the gear stage is one of first speed 1ST to third speed 3RD in the low-speed range, and high clutch H/C must be in the engagement state when the gear stage is one of fourth speed 4TH to sixth speed 6TH in the high-speed range. Here, fourth speed 4TH corresponds to the predetermined gear stage as explained above. Low clutch LOW/C is the friction element to be engaged at all the gear stages in the low-speed range. High clutch H/C is the friction element to be engaged at all the gear stages in the high-speed range.

Figure 8:
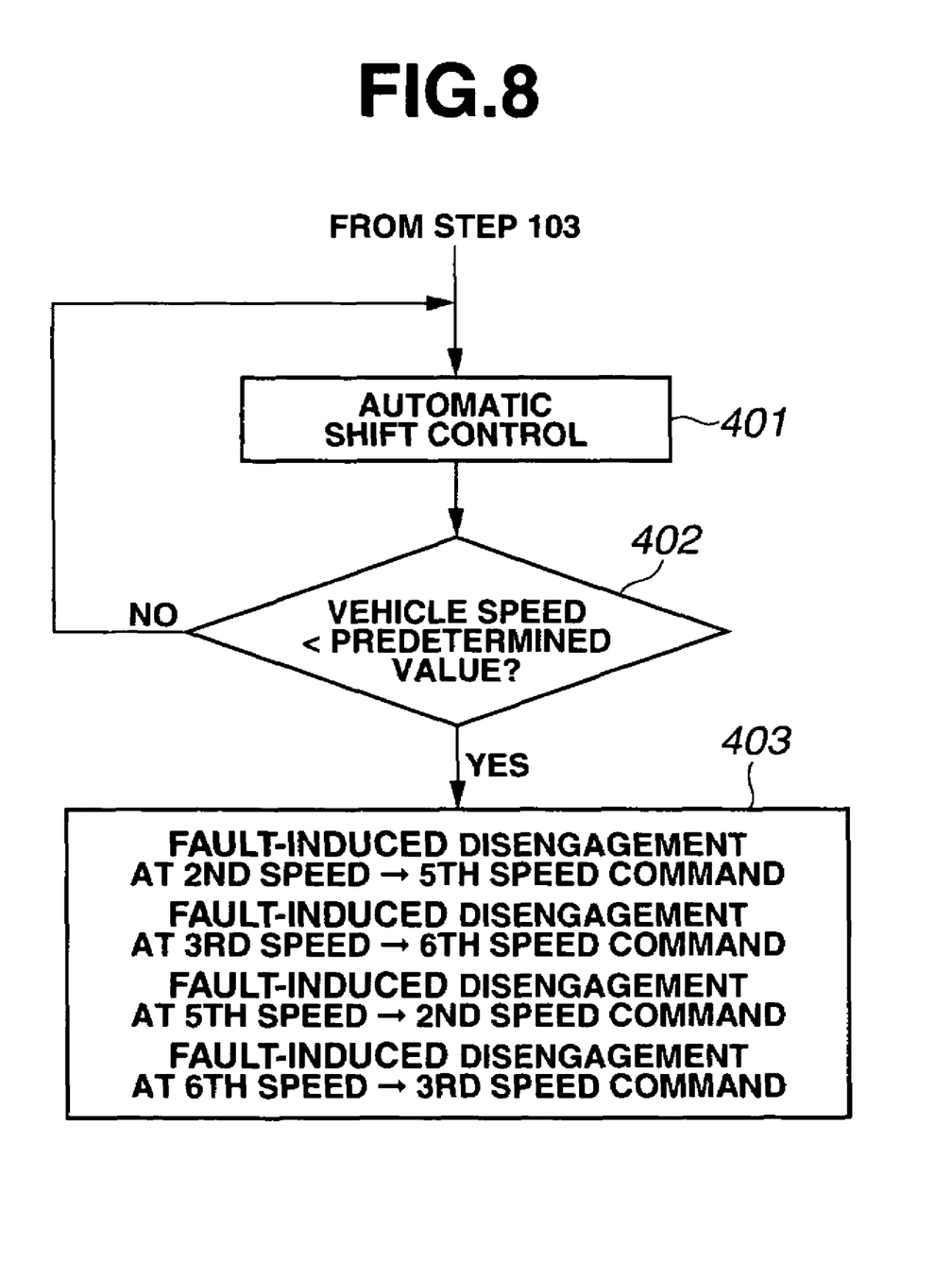

Referring to FIG. 8, the third control in abnormal condition which is carried out at block 400 of FIG. 4 is explained. In the third control in abnormal condition, operations at blocks 401 and 402 are the same as those at blocks 201 and 202 of the first control in abnormal condition as explained above, and therefore, detailed explanations therefor are omitted. When the answer to block 402 is no, the logic flow goes back to block 401. When the answer to block 402 is yes, indicating that the vehicle is stopped, the logic flow goes to block 403. At block 403, a command to establish a gear stage that acts as the avoidance gear stage, depending on the gear stage in which the fault-induced disengagement has occurred. Here, the gear stage in which the fault-induced disengagement has occurred includes second speed 2ND, third speed 3RD, fifth speed 5TH and sixth speed 6TH.

As seen from FIG. 5, at the gear stages of second speed 2ND, third speed 3RD, fifth speed 5TH and sixth speed 6TH, it is not possible to determine which one of the friction elements is undergoing the fault-induced disengagement. However, these gear stages correspond to such a gear stage that can be established by combination of engagement of the friction elements other than the friction elements to be engaged at second speed 2ND, third speed 3RD, fifth speed 5TH and sixth speed 6TH. Therefore, in the event that the fault-induced disengagement has occurred at second speed 2ND, third speed 3RD, fifth speed 5TH or sixth speed 6TH, the gear stage established by combination of engagements of the friction elements other than the friction elements to be engaged at the second, third, fifth or sixth speeds can be selected as the avoidance gear stage.

Specifically, when the fault-induced disengagement has occurred at second speed 2ND which is to be established by the combination of engagements of low clutch LOW/C and 2-6 brake 2-6/B, a command to establish fifth speed 5TH, namely, a command to achieve the combination of engagements of 3-5 reverse clutch 3-5R/C and high clutch H/C, is output to restart the vehicle. When the fault-induced disengagement has occurred at third speed 3RD which is to be established by the combination of engagements of low clutch LOW/C and 3-5 reverse clutch 3-5R/C, a command to establish sixth speed 6TH, namely, a command to achieve the combination of engagements of high clutch H/C and 2-6 brake 2-6/B, is output to restart the vehicle. When the fault-induced disengagement has occurred at fifth speed 5TH which is to be established by the combination of engagements of 3-5 reverse clutch 3-5R/C and high clutch H/C, a command to establish second speed 2ND, namely, a command to achieve the combination of engagements of low clutch LOW/C and 2-6 brake 2-6/B, is output to restart the vehicle. When the fault-induced disengagement has occurred at sixth speed 6TH which is to be established by the combination of engagements of high clutch H/C and 2-6 brake 2-6/B, a command to establish third speed 3RD, namely, a command to achieve the combination of engagements of low clutch LOW/C and 3-5 reverse clutch 3-5R/C, is output to restart the vehicle. By the third control in abnormal condition as explained above, the avoidance gear stage that is established without using the friction elements in the fault-induced disengagement can be established immediately after the vehicle is stopped. As a result, the vehicle can be restarted traveling without rapid increase in engine speed.

Figure 9:
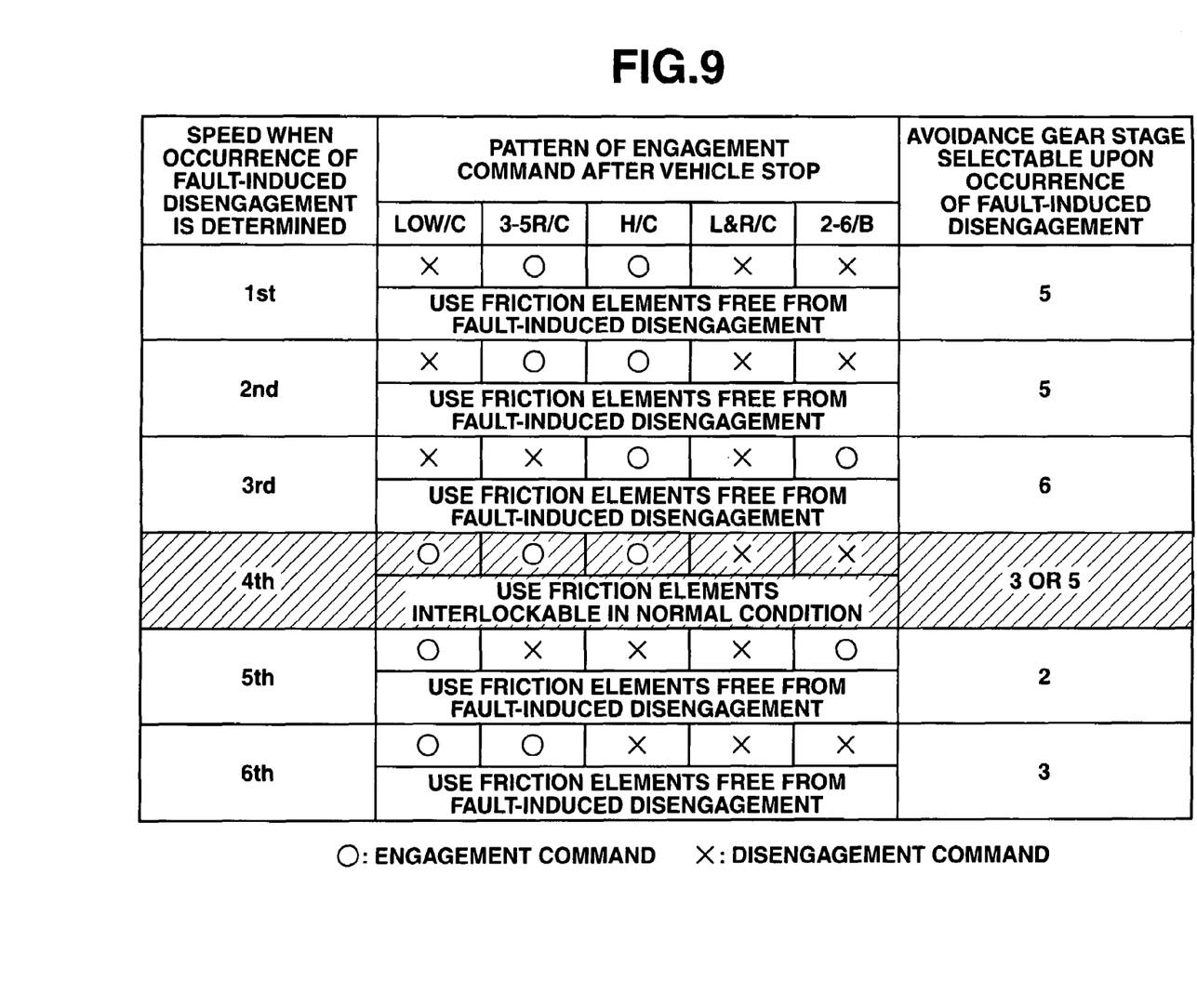
FIG. 9 is a diagram showing a pattern of engagement command output in the controls in abnormal condition.

FIG. 9 illustrates a pattern of engagement command that is output after the vehicle stop upon the first to third controls in abnormal condition as explained above.

In the above-described system and method of the present invention, if it is possible to determine what friction element is undergoing the fault-induced disengagement when occurrence of the fault-induced disengagement of the friction element to be engaged at a current gear stage is detected, another gear stage different from the gear stage at the time of occurrence of the fault-induced disengagement can be established by engagement of the friction elements other than the friction element undergoing the fault-induced disengagement. Further, even when it is not possible to determine what friction element is undergoing the fault-induced disengagement when the occurrence of the fault-induced disengagement to be engaged at a current gear stage is detected, another gear stage different from the gear stage at the time of occurrence of the fault-induced disengagement can be established by combination of engagements of the friction elements other than the friction elements which are to be engaged at the time of occurrence of the fault-induced disengagement. Further, if it is not possible to determine what friction element is undergoing the fault-induced disengagement, and the gear stage at the time of occurrence of the fault-induced disengagement is a predetermined gear stage which is established by combination of engagements of the friction elements which independently constitute an essential friction element to be engaged for establishing any of gear stages other than the gear stage at the time of occurrence of the fault-induced disengagement, a plurality of commands to establish a plurality of gear stages corresponding to combination of engagement of the friction elements to be engaged at the gear stage at the time of occurrence of the fault-induced disengagement, and engagement of the friction element to be disengaged at the gear stage at the time of occurrence of the fault-induced disengagement are simultaneously output. As a result, among the gear stages commanded, the gear stage which is established by combination of engagement of the friction element free from the fault-induced disengagement among the friction elements to be engaged at the gear stage at the time of occurrence of the fault-induced disengagement, and engagement of the friction elements to be disengaged at the gear stage at the time of occurrence of the fault-induced disengagement, can be selected.

Accordingly, regardless of whether or not it is possible to determine what friction element is in the fault-induced disengagement state, the gear stage enabling power transmission can be established to thereby allow the vehicle traveling. Further, even when the gear stage at the time of occurrence of the fault-induced disengagement is not the above-described predetermined gear stage, another gear stage different from the gear stage at the time of occurrence of the fault-induced disengagement can be promptly established by the combination of engagement of the friction element free from the fault-induced disengagement among the friction elements to be engaged at the gear stage at the time of occurrence of the fault-induced disengagement, and engagement of the friction elements to be disengaged at the gear stage at the time of occurrence of the fault-induced disengagement. Therefore, as compared to the case where a plurality of commands to establish multiple gear stages are sequentially output, rapid increase in engine speed can be suppressed to thereby prevent the vehicle's occupant from feeling abnormal.

Particularly, when the fault-induced disengagement has occurred at the gear stage, i.e., fourth speed 4TH, which is to be established by combination of engagement of low clutch LOW/C to be engaged in the entire low-speed range and engagement of high clutch H/C to be engaged in the entire high-speed range, a plurality of commands to establish the different gear stages are simultaneously output to thereby ensure suppression of the rapid increase in engine speed.

Further, when the fault-induced disengagement has occurred in low clutch LOW/C at first speed 1ST, fifth speed 5TH having the largest gear ratio can be established instead of sixth speed 6TH. This serves for readily conducting restart of the vehicle subsequent to the stop.

Further, the command to establish the avoidance gear stage without using the friction element that is undergoing the fault-induced disengagement is output immediately after the vehicle is stopped. Accordingly, if the fault-induced disengagement has occurred during high-speed traveling at fifth speed 5TH, a direct downshift to second speed 2ND can be prevented to thereby suppress occurrence of abrupt braking.

Further, the determination of occurrence of the fault-induced disengagement is not limited to the above-described embodiment, and various manners of the determination may be adopted. Further, the system and method of the present invention can be applied to not only the automatic transmission having the gear train as shown in FIG. 1 but also automatic transmissions having other various types of gear trains. Furthermore, the system and method of the present invention can be applied to an automatic transmission having multiple rearward gear stages.

This application is based on a prior Japanese Patent Application No. 2005-158502 filed on May 31, 2005. The entire contents of the Japanese Patent Application No. 2005-158502 is hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An automatic transmission control system, comprising:
   a transmission gear train which perform multiple gear stages by combination of engagements of a plurality of friction elements; and
   an electronic control unit is programmed to:
   detect occurrence of fault-induced disengagement in any of the friction elements to be engaged at a current gear stage;
   determine the friction element which is undergoing the fault-induced disengagement;
   output a command to establish another gear stage different from the gear stage at the time of occurrence of the fault-induced disengagement by combination of engagements of the friction elements other than the friction elements to be engaged at the time of occurrence of the fault-induced disengagement; and
   simultaneously output a plurality of commands to establish a plurality of gear stages corresponding to combination of engagement of the friction elements to be engaged at the gear stage at the time of occurrence of the fault-induced disengagement, and engagement of the friction elements to be disengaged at the gear stage at the time of occurrence of the fault-induced disengagement to thereby establish any one of the plurality of gear stages by combination of engagement of the friction element free from the fault-induced disengagement among the friction elements to be engaged at the gear stage at the time of occurrence of the fault-induced disengagement, and engagement of the friction elements to be disengaged at the gear stage at the time of occurrence of the fault-induced disengagement, when the gear stage at the time of occurrence of the fault-induced disengagement is a predetermined gear stage which is established by combination of engagements of the friction elements which independently constitute an essential friction element to be engaged for establishing any of gear stages other than the predetermined gear stage, and the friction element undergoing the fault-induced disengagement is not determined.

2. The automatic transmission control system as claimed in claim 1, wherein the multiple gear stages comprise forward gear stages which are divided into two groups including a low-speed range and a high-speed range, and the predetermined gear stage is established by combination of engagement of a first friction element to be engaged in the low-speed range in entirety and engagement of a second friction element to be engaged in the high-speed range in entirety.

3. The automatic transmission control system as claimed in claim 2, wherein the forward gear stages comprise first speed, second speed, third speed, fourth speed, fifth speed and sixth speed, the plurality of friction elements comprise a low clutch to be engaged at the first, second, third and fourth speeds, a high clutch to be engaged at the fourth, fifth and sixth speeds, and a 3-5 reverse clutch to be engaged at the third and fifth speeds, the predetermined gear stage is a fourth speed among the first to sixth speeds, the first friction element is the low clutch, the second friction element is the high clutch, and the plurality of commands comprise a command to establish the third speed by combination of engagements of the low clutch and the 3-5 reverse clutch and a command to establish the fifth speed by combination of engagements of the high clutch and the 3-5 reverse clutch.

4. The automatic transmission control system as claimed in claim 1, wherein the automatic transmission is adapted to be installed in a vehicle, and the electronic control unit outputs the command after the vehicle is stopped.

5. The automatic transmission control system as claimed in claim 4, wherein the electronic control unit outputs a command to establish a gear stage which has a largest gear ratio among the gear stages which are allowable by combination of engagements of the friction elements other than the friction element which is undergoing the fault-induced disengagement.

6. An automatic transmission control system, comprising:
a transmission gear train which perform multiple gear stages by combination of engagements of a plurality of friction elements;
a detection means for detecting occurrence of fault-induced disengagement in any of the friction elements to be engaged at a current gear stage;
a determination means for determining the friction element which is undergoing the fault-induced disengagement; and
a command means for outputting a command to establish another gear stage different from the gear stage at the time of occurrence of the fault-induced disengagement by combination of engagements of the friction elements other than the friction elements to be engaged at the time of occurrence of the fault-induced disengagement,
wherein the command means further simultaneously outputs a plurality of commands to establish a plurality of gear stages corresponding to combination of engagement of the friction elements to be engaged at the gear stage at the time of occurrence of the fault-induced disengagement, and engagement of the friction elements to be disengaged at the gear stage at the time of occurrence of the fault-induced disengagement to thereby establish any one of the plurality of gear stages by combination of engagement of the friction element free from the fault-induced disengagement among the friction elements to be engaged at the gear stage at the time of occurrence of the fault-induced disengagement, and engagement of the friction elements to be disengaged at the gear stage at the time of occurrence of the fault-induced disengagement, when the gear stage at the time of occurrence of the fault-induced disengagement is a predetermined gear stage which is established by combination of engagements of the friction elements which independently constitute an essential friction element to be engaged for establishing any of gear stages other than the predetermined gear stage, and the friction element undergoing the fault-induced disengagement is not determined by the determination means.

7. The automatic transmission control system as claimed in claim 6, wherein the multiple gear stages comprise forward gear stages which are divided into two groups including a low-speed range and a high-speed range, and the predetermined gear stage is established by combination of engagement of a first friction element to be engaged in the low-speed range in entirety and engagement of a second friction element to be engaged in the high-speed range in entirety.

8. The automatic transmission control system as claimed in claim 7, wherein the forward gear stages comprise first speed, second speed, third speed, fourth speed, fifth speed and sixth speed, the plurality of friction elements comprise a low clutch to be engaged at the first, second, third and fourth speeds, a high clutch to be engaged at the fourth, fifth and sixth speeds, and a 3-5 reverse clutch to be engaged at the third and fifth speeds, the predetermined gear stage is a fourth speed among the first to sixth speeds, the first friction element is the low clutch, the second friction element is the high clutch, and the plurality of commands comprise a command to establish the third speed by combination of engagements of the low clutch and the 3-5 reverse clutch and a command to establish the fifth speed by combination of engagements of the high clutch and the 3-5 reverse clutch.

9. The automatic transmission control system as claimed in claim 6, wherein the automatic transmission is adapted to be installed in a vehicle, and the command means outputs the command after the vehicle is stopped.

10. The automatic transmission control system as claimed in claim 9, wherein the command means outputs a command to establish a gear stage which has a largest gear ratio among the gear stages which are allowable by combination of engagements of the friction elements other than the friction element which is undergoing the fault-induced disengagement.

11. A method of controlling an automatic transmission, the automatic transmission including a transmission gear train which perform multiple gear stages by combination of engagements of a plurality of friction elements, the method comprising:
detecting occurrence of fault-induced disengagement in any of the friction elements to be engaged at a current gear stage;
determining the friction element which is undergoing the fault-induced disengagement;
determining whether the gear stage at the time of occurrence of the fault-induced disengagement is a predetermined gear stage which is established by combination of engagements of the friction elements which independently constitute an essential friction element to be engaged for establishing any of gear stages other than the predetermined gear stage;

conducting a first control in abnormal condition by outputting a command to establish another gear stage different from the gear stage at the time of occurrence of the fault-induced disengagement by combination of engagements of the friction elements other than the friction element which is undergoing the fault-induced disengagement when the friction element undergoing the fault-induced disengagement is determined;

conducting a second control in abnormal condition by simultaneously outputting a plurality of commands to establish a plurality of gear stages corresponding to combination of engagement of the friction elements to be engaged at the gear stage at the time of occurrence of the fault-induced disengagement, and engagement of the friction elements to be disengaged at the gear stage at the time of occurrence of the fault-induced disengagement to thereby establish any one of the plurality of gear stages by combination of engagement of the friction element free from the fault-induced disengagement among the friction elements to be engaged at the gear stage at the time of occurrence of the fault-induced disengagement, and engagement of the friction elements to be disengaged at the gear stage at the time of occurrence of the fault-induced disengagement, when the gear stage at the time of occurrence of the fault-induced disengagement is the predetermined gear stage and the friction element undergoing the fault-induced disengagement is not determined; and conducting a third control in abnormal condition by outputting a command to establish another gear stage different from the gear stage at the time of occurrence of the fault-induced disengagement by combination of engagements of the friction elements other than the friction elements to be engaged at the time of occurrence of the fault-induced disengagement, when the gear stage at the time of occurrence of the fault-induced disengagement is any of gear stages other than the predetermined gear stage and the friction element undergoing the fault-induced disengagement is not determined.

12. The method as claimed in claim 11, wherein the multiple gear stages comprise forward gear stages which are divided into two groups including a low-speed range and a high-speed range, and the predetermined gear stage is established by combination of engagement of a first friction element to be engaged in the low-speed range in entirety and a second friction element to be engaged in the high-speed range in entirety.

13. The method as claimed in claim 11, wherein the forward gear stages comprise first speed, second speed, third speed, fourth speed, fifth speed and sixth speed, the plurality of friction elements comprise a low clutch to be engaged at the first, second, third and fourth speeds, a high clutch to be engaged at the fourth, fifth and sixth speeds, and a 3-5 reverse clutch to be engaged at the third and fifth speeds, the predetermined gear stage is a fourth speed among the first to sixth speeds, the first friction element is the low clutch, the second friction element is the high clutch, and the plurality of commands comprise a command to establish the third speed by combination of engagements of the low clutch and the 3-5 reverse clutch and a command to establish the fifth speed by combination of engagements of the high clutch and the 3-5 reverse clutch.

14. The method as claimed in claim 11, wherein the automatic transmission is adapted to be installed in a vehicle, and the operations of outputting a command and outputting a plurality of commands are conducted after the vehicle is stopped.

15. The method as claimed in claim 14, wherein the step of conducting a first control in abnormal condition comprises outputting a command to establish a gear stage which has a largest gear ratio among the gear stages which are allowable by combination of engagements of the friction elements other than the friction element which is undergoing the fault-induced disengagement.

* * * * *